US011942724B2

(12) United States Patent
Lu

(10) Patent No.: US 11,942,724 B2
(45) Date of Patent: Mar. 26, 2024

(54) ELECTRICAL CONNECTOR HAVING SYMMETRICAL DOCKING HOLES

(71) Applicant: Amphenol East Asia Ltd., Taoyuan (TW)

(72) Inventor: Lo-Wen Lu, Taoyuan (TW)

(73) Assignee: Amphenol East Asia Ltd., Taoyuan (TW)

( * ) Notice: Subject to any disclaimer, the term of this patent is extended or adjusted under 35 U.S.C. 154(b) by 0 days.

(21) Appl. No.: 18/147,410

(22) Filed: Dec. 28, 2022

(65) Prior Publication Data

US 2023/0178931 A1 Jun. 8, 2023

Related U.S. Application Data

(63) Continuation of application No. 17/365,465, filed on Jul. 1, 2021, now Pat. No. 11,569,613.

(30) Foreign Application Priority Data

Apr. 19, 2021 (TW) ................................ 110204288

(51) Int. Cl.
*H01R 13/629* (2006.01)
*H01R 13/05* (2006.01)
(Continued)

(52) U.S. Cl.
CPC ........... *H01R 13/629* (2013.01); *H01R 13/05* (2013.01); *H01R 13/11* (2013.01); *H01R 13/502* (2013.01);
(Continued)

(58) Field of Classification Search
CPC ...... H01R 13/629; H01R 13/05; H01R 13/11; H01R 13/502; H01R 13/516; H01R 13/627
See application file for complete search history.

(56) References Cited

U.S. PATENT DOCUMENTS 2,996,710 A 8/1961 Pratt
3,002,162 A 9/1961 Garstang
(Continued)

FOREIGN PATENT DOCUMENTS

CN 1179448 C 12/2004
CN 1799290 A 7/2006
(Continued)

OTHER PUBLICATIONS

Extended European Search Report for European Application No. EP 11166820.8 dated Jan. 24, 2012.
(Continued)

*Primary Examiner* — Abdullah A Riyami
*Assistant Examiner* — Nader J Alhawamdeh
(74) *Attorney, Agent, or Firm* — Wolf, Greenfield & Sacks, P.C.

(57) ABSTRACT

An electrical connector may include an insulating body, metal terminals exposed in a mating port of the insulating body, and a metal housing that includes walls. The walls may encircle the insulating body such that a first space is located between a first side of the insulating body and a first wall of the metal housing, a second space is located between a second side of the insulating body and a second wall of the metal housing, and a length of the first space is different from a length of the second space. The first and second walls may face in opposite directions. The mating port may receive a portion of a mating connector. The first wall may include first latching portions in communication with the first space, and the second wall may include second latching portions in communication with the second space.

20 Claims, 7 Drawing Sheets

(51) Int. Cl.
*H01R 13/11* (2006.01)
*H01R 13/502* (2006.01)
*H01R 13/516* (2006.01)
*H01R 13/627* (2006.01)
(52) U.S. Cl.
CPC ......... *H01R 13/516* (2013.01); *H01R 13/627* (2013.01)

(56) References Cited

U.S. PATENT DOCUMENTS 3,134,950 A 5/1964 Cook
3,322,885 A 5/1967 May et al.
3,786,372 A 1/1974 Epis et al.
3,825,874 A 7/1974 Peverill
3,863,181 A 1/1975 Glance et al.
4,155,613 A 5/1979 Brandeau
4,195,272 A 3/1980 Boutros
4,276,523 A 6/1981 Boutros et al.
4,371,742 A 2/1983 Manly
4,408,255 A 10/1983 Adkins
4,447,105 A 5/1984 Ruehl
4,471,015 A 9/1984 Ebneth et al.
4,484,159 A 11/1984 Whitley
4,490,283 A 12/1984 Kleiner
4,518,651 A 5/1985 Wolfe, Jr.
4,519,664 A 5/1985 Tillotson
4,519,665 A 5/1985 Althouse et al.
4,632,476 A 12/1986 Schell
4,636,752 A 1/1987 Saito
4,682,129 A 7/1987 Bakermans et al.
4,751,479 A 6/1988 Parr
4,761,147 A 8/1988 Gauthier
4,806,107 A 2/1989 Arnold et al.
4,846,724 A 7/1989 Sasaki et al.
4,846,727 A 7/1989 Glover et al.
4,878,155 A 10/1989 Conley
4,948,922 A 8/1990 Varadan et al.
4,970,354 A 11/1990 Iwasa et al.
4,975,084 A 12/1990 Fedder et al.
4,992,060 A 2/1991 Meyer
5,000,700 A 3/1991 Masubuchi et al.
5,013,262 A 5/1991 Shibano
5,030,140 A 7/1991 Sugiyama
5,066,236 A 11/1991 Broeksteeg
5,141,454 A 8/1992 Garrett et al.
5,150,086 A 9/1992 Ito
5,166,527 A 11/1992 Solymar
5,168,252 A 12/1992 Naito
5,168,432 A 12/1992 Murphy et al.
5,176,538 A 1/1993 Hansell, III et al.
5,266,055 A 11/1993 Naito et al.
5,280,257 A 1/1994 Cravens et al.
5,287,076 A 2/1994 Johnescu et al.
5,334,050 A 8/1994 Andrews
5,340,334 A 8/1994 Nguyen
5,346,410 A 9/1994 Moore, Jr.
5,429,520 A 7/1995 Morlion et al.
5,429,521 A 7/1995 Morlion et al.
5,433,617 A 7/1995 Morlion et al.
5,433,618 A 7/1995 Morlion et al.
5,456,619 A 10/1995 Belopolsky et al.
5,461,392 A 10/1995 Mott et al.
5,474,472 A 12/1995 Niwa et al.
5,484,310 A 1/1996 McNamara et al.
5,496,183 A 3/1996 Soes et al.
5,499,935 A 3/1996 Powell
5,551,893 A 9/1996 Johnson
5,562,497 A 10/1996 Yagi et al.
5,597,328 A 1/1997 Mouissie
5,651,702 A 7/1997 Hanning et al.
5,669,789 A 9/1997 Law
5,796,323 A 8/1998 Uchikoba et al.
5,831,491 A 11/1998 Buer et al.
5,924,899 A 7/1999 Paagman
5,981,869 A 11/1999 Kroger
5,982,253 A 11/1999 Perrin et al.
6,019,616 A 2/2000 Yagi et al.
6,152,747 A 11/2000 McNamara
6,168,469 B1 1/2001 Lu
6,174,203 B1 1/2001 Asao
6,174,944 B1 1/2001 Chiba et al.
6,217,372 B1 4/2001 Reed
6,293,827 B1 9/2001 Stokoe
6,296,496 B1 10/2001 Trammel
6,299,438 B1 10/2001 Sahagian et al.
6,299,483 B1 10/2001 Cohen et al.
6,328,601 B1 12/2001 Yip et al.
6,347,962 B1 2/2002 Kline
6,350,134 B1 2/2002 Fogg et al.
6,364,711 B1 4/2002 Berg et al.
6,375,510 B2 4/2002 Asao
6,379,188 B1 4/2002 Cohen et al.
6,398,588 B1 6/2002 Bickford
6,409,543 B1 6/2002 Astbury, Jr. et al.
6,482,017 B1 11/2002 Van Doorn
6,503,103 B1 1/2003 Cohen et al.
6,506,076 B2 1/2003 Cohen et al.
6,517,360 B1 2/2003 Cohen
6,530,790 B1 3/2003 McNamara et al.
6,537,087 B2 3/2003 McNamara et al.
6,554,647 B1 4/2003 Cohen et al.
6,565,387 B2 5/2003 Cohen
6,565,390 B2 5/2003 Wu
6,579,116 B2 6/2003 Brennan et al.
6,582,244 B2 6/2003 Fogg et al.
6,595,802 B1 7/2003 Watanabe et al.
6,602,095 B2 8/2003 Astbury, Jr. et al.
6,616,864 B1 9/2003 Jiang et al.
6,652,318 B1 11/2003 Winings et al.
6,655,966 B2 12/2003 Rothermel et al.
6,709,294 B1 3/2004 Cohen et al.
6,713,672 B1 3/2004 Stickney
6,743,057 B2 6/2004 Davis et al.
6,776,659 B1 8/2004 Stokoe et al.
6,786,771 B2 9/2004 Gailus
6,814,619 B1 11/2004 Stokoe et al.
6,830,489 B2 12/2004 Aoyama
6,872,085 B1 3/2005 Cohen et al.
6,902,432 B2 6/2005 Morikawa et al.
6,979,226 B2 12/2005 Otsu et al.
7,044,794 B2 5/2006 Consoli et al.
7,057,570 B2 6/2006 Irion, II et al.
7,074,086 B2 7/2006 Cohen et al.
7,094,102 B2 8/2006 Cohen et al.
7,108,556 B2 9/2006 Cohen et al.
7,163,421 B1 1/2007 Cohen et al.
7,226,314 B2 6/2007 Lang et al.
7,285,018 B2 10/2007 Kenny et al.
7,303,438 B2 12/2007 Dawiedczyk et al.
7,335,063 B2 2/2008 Cohen et al.
7,344,409 B2 3/2008 Lang et al.
7,410,365 B2 8/2008 Wu
7,491,089 B2 2/2009 Lang et al.
7,494,383 B2 2/2009 Cohen et al.
7,540,781 B2 6/2009 Kenny et al.
7,581,990 B2 9/2009 Kirk et al.
7,588,464 B2 9/2009 Kim
7,699,644 B2 4/2010 Szczesny et al.
7,722,401 B2 5/2010 Kirk et al.
7,731,537 B2 6/2010 Amleshi et al.
7,753,731 B2 7/2010 Cohen et al.
7,771,233 B2 8/2010 Gailus
7,794,240 B2 9/2010 Cohen et al.
7,794,278 B2 9/2010 Cohen et al.
7,806,729 B2 10/2010 Nguyen et al.
7,862,378 B1 1/2011 Wan et al.
7,874,873 B2 1/2011 Do et al.
7,887,371 B2 2/2011 Kenny et al.
7,887,379 B2 2/2011 Kirk
7,906,730 B2 3/2011 Atkinson et al.
7,914,304 B2 3/2011 Cartier et al.
7,985,097 B2 7/2011 Gulla
8,083,553 B2 12/2011 Manter et al.

(56) References Cited

U.S. PATENT DOCUMENTS

| | | | | |
|---|---|---|---|---|
| 8,182,289 | B2 | 5/2012 | Stokoe et al. | |
| 8,215,968 | B2 | 7/2012 | Cartier et al. | |
| 8,216,001 | B2 | 7/2012 | Kirk | |
| 8,257,095 | B2 * | 9/2012 | Akai | H01R 13/6315 439/74 |
| 8,272,877 | B2 | 9/2012 | Stokoe et al. | |
| 8,348,701 | B1 | 1/2013 | Lan et al. | |
| 8,371,875 | B2 | 2/2013 | Gailus | |
| 8,382,524 | B2 | 2/2013 | Khilchenko et al. | |
| 8,439,706 | B2 | 5/2013 | Sytsma et al. | |
| 8,454,381 | B2 | 6/2013 | Wu | |
| 8,657,627 | B2 | 2/2014 | McNamara et al. | |
| 8,715,003 | B2 | 5/2014 | Buck et al. | |
| 8,771,016 | B2 | 7/2014 | Atkinson et al. | |
| 8,864,521 | B2 | 10/2014 | Atkinson et al. | |
| 8,926,377 | B2 | 1/2015 | Kirk et al. | |
| 8,944,831 | B2 | 2/2015 | Stoner et al. | |
| 8,998,642 | B2 | 4/2015 | Manter et al. | |
| 9,004,942 | B2 | 4/2015 | Paniauqa | |
| 9,022,806 | B2 | 5/2015 | Cartier, Jr. et al. | |
| 9,028,281 | B2 | 5/2015 | Kirk et al. | |
| 9,124,009 | B2 | 9/2015 | Atkinson et al. | |
| 9,219,335 | B2 | 12/2015 | Atkinson et al. | |
| 9,225,085 | B2 | 12/2015 | Cartier, Jr. et al. | |
| 9,300,074 | B2 | 3/2016 | Gailus | |
| 9,450,344 | B2 | 9/2016 | Cartier, Jr. et al. | |
| 9,484,674 | B2 | 11/2016 | Cartier, Jr. et al. | |
| 9,509,101 | B2 | 11/2016 | Cartier, Jr. et al. | |
| 9,520,689 | B2 | 12/2016 | Cartier, Jr. et al. | |
| 9,559,467 | B1 | 1/2017 | Khorrami et al. | |
| 9,742,132 | B1 * | 8/2017 | Hsueh | H01R 24/60 |
| 9,972,945 | B1 | 5/2018 | Huang et al. | |
| 10,079,449 | B1 | 9/2018 | Chien et al. | |
| 10,096,944 | B2 | 10/2018 | Huang et al. | |
| 10,122,129 | B2 | 11/2018 | Milbrand, Jr. et al. | |
| 10,236,605 | B1 | 3/2019 | Henry et al. | |
| 10,243,304 | B2 | 3/2019 | Kirk et al. | |
| 10,270,191 | B1 | 4/2019 | Li et al. | |
| 10,283,910 | B1 | 5/2019 | Chen et al. | |
| 10,348,040 | B2 | 7/2019 | Cartier, Jr. et al. | |
| 10,381,767 | B1 | 8/2019 | Milbrand, Jr. et al. | |
| 10,601,181 | B2 | 3/2020 | Lu et al. | |
| 10,777,921 | B2 * | 9/2020 | Lu | H01R 12/7005 |
| 10,868,387 | B2 | 12/2020 | Hsiao et al. | |
| 10,886,649 | B1 | 1/2021 | Yang et al. | |
| 11,128,092 | B2 * | 9/2021 | Yang | H01R 13/6273 |
| 11,146,025 | B2 * | 10/2021 | Lu | H01R 13/6581 |
| 11,171,445 | B1 | 11/2021 | Shen et al. | |
| 11,189,971 | B2 * | 11/2021 | Lu | H01R 12/75 |
| 11,289,850 | B2 | 3/2022 | Faith | |
| 11,303,065 | B2 | 4/2022 | Wang et al. | |
| 11,569,613 | B2 | 1/2023 | Lu | |
| 2001/0042632 | A1 | 11/2001 | Manov et al. | |
| 2002/0042223 | A1 | 4/2002 | Belopolsky et al. | |
| 2002/0089464 | A1 | 7/2002 | Joshi | |
| 2002/0098738 | A1 | 7/2002 | Astbury et al. | |
| 2002/0111068 | A1 | 8/2002 | Cohen et al. | |
| 2002/0111069 | A1 | 8/2002 | Astbury et al. | |
| 2002/0146926 | A1 | 10/2002 | Fogg et al. | |
| 2004/0005815 | A1 | 1/2004 | Mizumura et al. | |
| 2004/0020674 | A1 | 2/2004 | McFadden et al. | |
| 2004/0115968 | A1 | 6/2004 | Cohen | |
| 2004/0121652 | A1 | 6/2004 | Gailus | |
| 2004/0196112 | A1 | 10/2004 | Welbon et al. | |
| 2004/0259419 | A1 | 12/2004 | Payne et al. | |
| 2005/0070160 | A1 | 3/2005 | Cohen et al. | |
| 2005/0133245 | A1 | 6/2005 | Katsuyama et al. | |
| 2005/0176835 | A1 | 8/2005 | Kobayashi et al. | |
| 2005/0233610 | A1 | 10/2005 | Tutt et al. | |
| 2005/0283974 | A1 | 12/2005 | Richard et al. | |
| 2005/0287869 | A1 | 12/2005 | Kenny et al. | |
| 2006/0068640 | A1 | 3/2006 | Gailus | |
| 2006/0160399 | A1 | 7/2006 | Dawiedczyk et al. | |
| 2006/0255876 | A1 | 11/2006 | Kushta et al. | |
| 2007/0004282 | A1 | 1/2007 | Cohen et al. | |
| 2007/0021001 | A1 | 1/2007 | Laurx et al. | |
| 2007/0037419 | A1 | 2/2007 | Sparrowhawk | |
| 2007/0042639 | A1 | 2/2007 | Manter et al. | |
| 2007/0054554 | A1 | 3/2007 | Do et al. | |
| 2007/0059961 | A1 | 3/2007 | Cartier et al. | |
| 2007/0218765 | A1 | 9/2007 | Cohen et al. | |
| 2008/0194146 | A1 | 8/2008 | Gailus | |
| 2008/0246555 | A1 | 10/2008 | Kirk et al. | |
| 2008/0248658 | A1 | 10/2008 | Cohen et al. | |
| 2008/0248659 | A1 | 10/2008 | Cohen et al. | |
| 2008/0248660 | A1 | 10/2008 | Kirk et al. | |
| 2009/0011641 | A1 | 1/2009 | Cohen et al. | |
| 2009/0011645 | A1 | 1/2009 | Laurx et al. | |
| 2009/0035955 | A1 | 2/2009 | McNamara | |
| 2009/0061661 | A1 | 3/2009 | Shuey et al. | |
| 2009/0117386 | A1 | 5/2009 | Vacanti et al. | |
| 2009/0170357 | A1 | 7/2009 | Yamashita et al. | |
| 2009/0239395 | A1 | 9/2009 | Cohen et al. | |
| 2009/0258516 | A1 | 10/2009 | Hiew et al. | |
| 2009/0291593 | A1 | 11/2009 | Atkinson et al. | |
| 2009/0305530 | A1 | 12/2009 | Ito et al. | |
| 2009/0305533 | A1 | 12/2009 | Feldman et al. | |
| 2010/0048058 | A1 | 2/2010 | Morgan et al. | |
| 2010/0062650 | A1 | 3/2010 | Nakamura | |
| 2010/0081302 | A1 | 4/2010 | Atkinson et al. | |
| 2010/0203772 | A1 * | 8/2010 | Mao | H01R 13/514 439/701 |
| 2010/0294530 | A1 | 11/2010 | Atkinson et al. | |
| 2011/0003509 | A1 | 1/2011 | Gailus | |
| 2011/0067237 | A1 | 3/2011 | Cohen et al. | |
| 2011/0104948 | A1 | 5/2011 | Girard, Jr. et al. | |
| 2011/0143605 | A1 | 6/2011 | Pepe | |
| 2011/0212649 | A1 | 9/2011 | Stokoe et al. | |
| 2011/0212650 | A1 | 9/2011 | Amleshi et al. | |
| 2011/0230095 | A1 | 9/2011 | Atkinson et al. | |
| 2011/0230096 | A1 | 9/2011 | Atkinson et al. | |
| 2011/0256739 | A1 | 10/2011 | Toshiyuki et al. | |
| 2011/0287663 | A1 | 11/2011 | Gailus et al. | |
| 2012/0094536 | A1 | 4/2012 | Khilchenko et al. | |
| 2012/0156929 | A1 | 6/2012 | Manter et al. | |
| 2012/0156938 | A1 | 6/2012 | Zhang | |
| 2012/0184154 | A1 | 7/2012 | Frank et al. | |
| 2012/0202363 | A1 | 8/2012 | McNamara et al. | |
| 2012/0202386 | A1 | 8/2012 | McNamara et al. | |
| 2012/0214344 | A1 | 8/2012 | Cohen et al. | |
| 2013/0012038 | A1 | 1/2013 | Kirk et al. | |
| 2013/0017733 | A1 | 1/2013 | Kirk et al. | |
| 2013/0078870 | A1 | 3/2013 | Milbrand, Jr. | |
| 2013/0090001 | A1 | 4/2013 | Kagotani | |
| 2013/0109232 | A1 | 5/2013 | Paniaqua | |
| 2013/0196553 | A1 | 8/2013 | Gailus | |
| 2013/0217263 | A1 | 8/2013 | Pan | |
| 2013/0225006 | A1 | 8/2013 | Khilchenko et al. | |
| 2013/0316590 | A1 | 11/2013 | Hon | |
| 2014/0004724 | A1 | 1/2014 | Cartier, Jr. et al. | |
| 2014/0004726 | A1 | 1/2014 | Cartier, Jr. et al. | |
| 2014/0004746 | A1 | 1/2014 | Cartier, Jr. et al. | |
| 2014/0057498 | A1 | 2/2014 | Cohen | |
| 2014/0273557 | A1 | 9/2014 | Cartier, Jr. et al. | |
| 2014/0273627 | A1 | 9/2014 | Cartier, Jr. et al. | |
| 2014/0377992 | A1 | 12/2014 | Chang et al. | |
| 2015/0056856 | A1 | 2/2015 | Atkinson et al. | |
| 2015/0111427 | A1 | 4/2015 | Wu et al. | |
| 2015/0236451 | A1 | 8/2015 | Cartier, Jr. et al. | |
| 2015/0236452 | A1 | 8/2015 | Cartier, Jr. et al. | |
| 2015/0255926 | A1 | 9/2015 | Paniagua | |
| 2016/0149343 | A1 | 5/2016 | Atkinson et al. | |
| 2017/0352970 | A1 | 12/2017 | Liang et al. | |
| 2018/0062323 | A1 | 3/2018 | Kirk et al. | |
| 2018/0145438 | A1 | 5/2018 | Cohen | |
| 2018/0205177 | A1 | 7/2018 | Zhou et al. | |
| 2018/0212376 | A1 | 7/2018 | Wang et al. | |
| 2018/0219331 | A1 | 8/2018 | Cartier, Jr. et al. | |
| 2018/0269607 | A1 * | 9/2018 | Wu | H01R 12/79 |
| 2019/0052019 | A1 | 2/2019 | Huang et al. | |
| 2019/0067854 | A1 | 2/2019 | Ju et al. | |
| 2019/0140385 | A1 | 5/2019 | Huo et al. | |
| 2019/0173209 | A1 * | 6/2019 | Lu | H01R 13/6599 |
| 2019/0173232 | A1 | 6/2019 | Lu et al. | |

(56) References Cited

U.S. PATENT DOCUMENTS

| | | | | |
|---|---|---|---|---|
| 2019/0267760 | A1 | 8/2019 | Chen | |
| 2020/0076132 | A1* | 3/2020 | Yang | H01R 12/73 |
| 2020/0203867 | A1* | 6/2020 | Lu | H01R 13/26 |
| 2020/0259294 | A1 | 8/2020 | Lu | |
| 2020/0266584 | A1* | 8/2020 | Lu | H01R 12/75 |
| 2020/0321727 | A1 | 10/2020 | Li et al. | |
| 2020/0335914 | A1 | 10/2020 | Hsu et al. | |
| 2020/0366019 | A1 | 11/2020 | Hsiao et al. | |
| 2021/0075159 | A1 | 3/2021 | Wang et al. | |
| 2021/0135404 | A1 | 5/2021 | Jiang | |
| 2021/0399451 | A1 | 12/2021 | Lu et al. | |
| 2022/0037817 | A1 | 2/2022 | Lu et al. | |
| 2022/0077632 | A1 | 3/2022 | Chen et al. | |
| 2022/0115799 | A1 | 4/2022 | Tanaka et al. | |
| 2022/0200208 | A1 | 6/2022 | Tseng et al. | |
| 2022/0255261 | A1 | 8/2022 | Yang et al. | |
| 2022/0336999 | A1 | 10/2022 | Lu | |
| 2022/0360016 | A1 | 11/2022 | Lu et al. | |
| 2022/0368077 | A1 | 11/2022 | Little | |
| 2023/0013147 | A1 | 1/2023 | Lu | |
| 2023/0052621 | A1 | 2/2023 | Little | |

FOREIGN PATENT DOCUMENTS

| | | | |
|---|---|---|---|
| CN | 101176389 | A | 5/2008 |
| CN | 101600293 | A | 12/2009 |
| CN | 101790818 | A | 7/2010 |
| CN | 101120490 | B | 11/2010 |
| CN | 201846527 | U | 5/2011 |
| CN | 102239605 | A | 11/2011 |
| CN | 101600293 | B | 5/2012 |
| CN | 102598430 | A | 7/2012 |
| CN | 202395248 | U | 8/2012 |
| CN | 104409906 | A | 3/2015 |
| CN | 304240766 | S | 8/2017 |
| CN | 304245430 | S | 8/2017 |
| CN | 206712089 | U | 12/2017 |
| CN | 207677189 | U | 7/2018 |
| CN | 110729594 | A | 1/2020 |
| CN | 209963304 | U | 1/2020 |
| CN | 210111108 | U | 2/2020 |
| CN | 210111108 | U * | 2/2020 |
| CN | 111196014 | A | 5/2020 |
| CN | 210723480 | U | 6/2020 |
| CN | 211655155 | U | 10/2020 |
| CN | 212571495 | U | 2/2021 |
| CN | 212968224 | U | 4/2021 |
| CN | 112952423 | A | 6/2021 |
| CN | 306646962 | S | 6/2021 |
| CN | 306646976 | S | 6/2021 |
| CN | 306647993 | S | 6/2021 |
| CN | 215184605 | U | 12/2021 |
| CN | 215299556 | U | 12/2021 |
| DE | 60216728 | T2 | 11/2007 |
| EP | 1018784 | A1 | 7/2000 |
| EP | 1779472 | A1 | 5/2007 |
| EP | 2169770 | A2 | 3/2010 |
| EP | 2405537 | A1 | 1/2012 |
| GB | 1272347 | A | 4/1972 |
| JP | H07-302649 | A | 11/1995 |
| JP | 2001-510627 | A | 7/2001 |
| JP | 2006-344524 | A | 12/2006 |
| MX | 9907324 | A1 | 8/2000 |
| TW | M558481 | U | 4/2018 |
| TW | M558482 | U | 4/2018 |
| TW | M558483 | U | 4/2018 |
| TW | M559006 | U | 4/2018 |
| TW | M559007 | U | 4/2018 |
| TW | M560138 | U | 5/2018 |
| TW | M562507 | U | 6/2018 |
| TW | M565894 | Y | 8/2018 |
| TW | M565895 | Y | 8/2018 |
| TW | M565899 | Y | 8/2018 |
| TW | M565900 | Y | 8/2018 |
| TW | M565901 | Y | 8/2018 |
| TW | M579828 | U | 6/2019 |
| TW | M583642 | U | 9/2019 |
| TW | 202211556 | A | 3/2022 |
| TW | 202220301 | A | 5/2022 |
| TW | D223498 | S | 2/2023 |
| WO | WO 88/05218 | A1 | 7/1988 |
| WO | WO 98/35409 | A1 | 8/1998 |
| WO | 2004/059794 | A2 | 7/2004 |
| WO | 2004/059801 | A1 | 7/2004 |
| WO | WO 2006/039277 | A1 | 4/2006 |
| WO | WO 2007/005597 | A2 | 1/2007 |
| WO | WO 2007/005599 | A1 | 1/2007 |
| WO | WO 2008/124057 | A2 | 10/2008 |
| WO | WO 2010/030622 | A1 | 3/2010 |
| WO | WO 2010/039188 | A1 | 4/2010 |
| WO | WO 2017/007429 | A1 | 1/2017 |

OTHER PUBLICATIONS

International Search Report and Written Opinion for International Application No. PCT/CN2017/108344 dated Aug. 1, 2018.
International Search Report with Written Opinion for International Application No. PCT/US2006/025562 dated Oct. 31, 2007.
International Search Report and Written Opinion for International Application No. PCT/US2005/034605 dated Jan. 26, 2006.
International Preliminary Report on Patentability for International Application No. PCT/US2010/056482 dated May 24, 2012.
International Search Report and Written Opinion for International Application No. PCT/US2010/056482 dated Mar. 14, 2011.
International Preliminary Report on Patentability for International Application No. PCT/US2011/026139 dated Sep. 7, 2012.
International Search Report and Written Opinion for International Application No. PCT/US2011/026139 dated Nov. 22, 2011.
International Search Report and Written Opinion for International Application No. PCT/US2011/034747 dated Jul. 28, 2011.
International Preliminary Report on Patentability for International Application No. PCT/US2012/023689 dated Aug. 15, 2013.
International Search Report and Written Opinion for International Application No. PCT/US2012/023689 dated Sep. 12, 2012.
International Search Report and Written Opinion for International Application No. PCT/US2012/060610 dated Mar. 29, 2013.
International Search Report and Written Opinion for International Application No. PCT/US2015/012463 dated May 13, 2015.
International Search Report and Written Opinion for International Application No. PCT/US2017/047905 dated Dec. 4, 2017.
[No Author Listed], Carbon Nanotubes For Electromagnetic Interference Shielding. SBIR/STTR. Award Information. Program Year 2001. Fiscal Year 2001. Materials Research Institute, LLC. Chu et al. Available at http://sbir.gov/sbirsearch/detail/225895. Last accessed Sep. 19, 2013.
[No Author Listed], SFF-TA-1016 Specification for Internal Unshielded High Speed Connector System. Rev 0.0.1. SNIA SFF TWG Technology Affiliate. Nov. 15, 2019. 40 pages.
Beaman, High Performance Mainframe Computer Cables. 1997 Electronic Components and Technology Conference. 1997;911-7.
Shi et al. Improving Signal Integrity in Circuit Boards by Incorporating Absorbing Materials. 2001 Proceedings. 51st Electronic Components and Technology Conference, Orlando FL. 2001:1451-56.
U.S. Appl. No. 17/348,598, filed Jun. 15, 2021, Lu.
U.S. Appl. No. 17/386,203, filed Jul. 27, 2021, Lu.
EP 11166820.8, Jan. 24, 2012, Extended European Search Report.
PCT/CN2017/108344, Aug. 1, 2018, International Search Report and Written Opinion.
PCT/US2005/034605, Jan. 26, 2006, International Search Report and Written Opinion.
PCT/US2006/025562, Oct. 31, 2007, International Search Report with Written Opinion.

* cited by examiner

ELECTRICAL CONNECTOR HAVING SYMMETRICAL DOCKING HOLES

CROSS-REFERENCE TO RELATED APPLICATION

The present application is a continuation of U.S. application Ser. No. 17/365,465 entitled "ELECTRICAL CONNECTOR HAVING SYMMETRICAL DOCKING HOLES" filed Jul. 1, 2021, which claims priority under 35 U.S.C. § 119 to Taiwan Application No. 110204288 filed in the Taiwan Patent Office on Apr. 19, 2021. The entire contents of each of these earlier applications is incorporated herein by reference.

FIELD OF THE DISCLOSURE

The present disclosure relates to an electrical connector and, in particular, a robust electrical connector having a versatile configuration that is able to provide a reliable and secure connection to reversible mating connectors (e.g., mating connectors that mate in two different orientations) as well as to non-reversible mating connectors (e.g., mating connectors that mate in only a single orientation). The electrical connector may be compact in size and may be a board-type connector configured to be mounted on a circuit board and to connect a mating connector to the circuit board.

BACKGROUND

In order to be able to receive and/or transmit electrical signals and power, electronic devices of all kinds (e.g., smartphones, tablet computers, desktop computers, notebook computers, digital cameras, etc.) have used electrical connectors. For example, to receive and/or transmit electrical signals and/or power from an external device, an electronic device may utilize an electrical connector to interconnect the devices. In another example, to receive and/or transmit signals within an electronic device, e.g., between circuit boards located at different regions of the electronic device, an electrical connector that fits within the electronic device's body may be utilized. In general, the term "electrical connector" may refer broadly to all devices for connecting elements together and carrying electrical signals and/or power between the connected elements.

An electrical connector may be a bridge for transferring signals to/from key components of an electronic device. Therefore, the quality of the electrical connector may affect the reliability of electrical transmissions (e.g., current, power, signals), and such reliability may be closely linked to reliability of operation of the electronic device. Further, because electrical connectors may function to interconnect multiple electronic devices to form a complete system, reliable operation of an entire system may be affected by the reliability of any one or more of the system's electrical connectors. Thus, it can be seen that electrical connectors that operate reliably are elements that are indispensable to electronic devices and that enable electronic devices to carry out their predetermined functions.

Electrical connectors may have many different types of structures, which have been adapted to accommodate the variety of different uses and/or mounting positions demanded by the electronic devices in which the signal connectors are deployed. For example, when a main unit of an electronic device (e.g., desktop computer, servo, on-board computer, etc.) has a relatively large volume, or when a mounting position is complex or concealed, manufacturers may opt to use a wired connector-design structure so that the bendable property of wires can be used advantageously to enable flexibility in the length(s) of the wire(s) used to connect an electronic device to another electronic device reliably. When available space is not a concern, the use of wires may provide flexibility in enabling interconnection of a component (e.g., a circuit board) in the electronic device to another component in the electronic device or in other electronic device, so as to be enable signal and/or power transmission between the components.

However, as designs of electronic devices of all kinds become more and more compact and lightweight, the structures of electrical connectors of all types have become more and more compact and lightweight, and consequently the features of the electrical connectors have become more and more precise. As the size of electrical connectors of all types becomes smaller and more precise, a concern is that the structural strength of these electrical connectors could be weakened, i.e., they could become more fragile, which could affect their transmission performance by increasing the possibility of an unstable connection. An additional concern is that, with their increased fragility, the service life of the electrical connectors could be shortened by incorrect handling. For example, in the process of plugging and unplugging a conventional electrical connector (especially in blind plugging operations), a user could apply force improperly or there could be a deviation from a correct direction or orientation when force is applied during plugging. Such erroneous handling could cause deformation and damage to an insulating body or housing of the connector. Thus, solving the question of how to effectively avoid the above-mentioned problems is an important task.

SUMMARY OF THE DISCLOSURE

With an understanding of the challenges of conventional electrical connectors and the need for improvement, and also with an understanding of the concerns of a fiercely competitive market, the inventor has conducted extensive research and experimentation to develop an electrical connector having symmetrical docking holes that, in some implementations, may be used advantageously to minimize the adverse effects of the problems and challenges mentioned above.

According to an aspect of the present invention, an electrical connector is provided that may be comprised of an insulating body, a terminal set, and a housing. The insulating body may be comprised of an accommodating space and a plug-in port arranged on a top side of the insulating body. The plug-in port may be in communication with the accommodating space. The terminal set may be comprised of a plurality of metal terminals fitted in a portion of the insulating body such that top portions of the metal terminals may be exposed to the accommodating space of the insulating body. The housing may be comprised of a plurality of walls defining an assembly space, with the walls of the housing being configured to surround external or outward-facing surfaces of the insulating body. The walls of the housing may be comprised of front and rear walls facing front and rear external surfaces of the insulating body, respectively. A portion of the front wall of the housing may be spaced apart from the front external surface of the insulating body to form a first docking slot in the assembly space. A portion of the rear wall of the housing may be spaced apart from the rear external surface of the insulating body to form a second docking slot in the assembly space. The front wall of the housing may be comprised of a plurality of front docking holes in communication with the first docking slot, and the rear wall of the housing may be comprised of a plurality of rear docking holes in communication with the second docking slot.

In some embodiments of this aspect, the housing may be comprised of at least one first snap-fit part located on the front wall or on the rear wall of the housing, and at least one second snap-fit part located on a left wall of the housing or on a right wall of the housing or on each of the left and right walls of the housing. The insulating body may be comprised of at least one third snap-fit part configured to engage with the at least one first snap-fit part of the housing when the insulating body is in an assembled or mated position with the housing, and at least one fourth snap-fit part configured to engage with the at least one second snap-fit part of the housing when the insulating body is in the assembled or mated position with the housing.

In some embodiments of this aspect, the housing may be comprised of at least one first guide part and at least one second guide part extending from the front wall of the housing or from the rear wall of the housing or from each of the front and rear walls of the housing, and at least one third guide part extending from a left wall of the housing or from a right wall of the housing or from each of the left and right walls of the housing. The first, second, and third guide parts may each be curved to form an inclined face that curves outwards and away from the assembly space, with the inclined faces being configured to guide a mating connector into the accommodating space of the insulating body.

In some embodiments of this aspect, the insulating body may be comprised of a terminal holding part that protrudes from a base of the insulating body into the accommodating space of the insulating body. The terminal holding part may be an island that is separated from an inner surface of the insulating body by the accommodating space. The terminal holding part may be comprised of a terminal holding space configured to receive the terminal set such that, when the terminal set is positioned in the terminal holding space, the terminal set extends into the insulating body from the base of the insulating body.

In some embodiments of this aspect, the front wall of the housing may be comprised of left and right regions separated by a central region. The left and right regions of the front wall may have a first height that is different from a second height of the central region of the front wall. The first and second heights of the front wall may extend from a bottom edge of the front wall of the housing. In some implementations, the second height may be less than the first height of the front wall, such that in a front elevational view the central region of the front wall may appear sunken.

In some embodiments of this aspect, the rear wall of the housing may be comprised of left and right regions separated by a central region. The left and right regions of the rear wall may have a first height that is different from a second height of central region of the rear wall. The first and second heights of the rear wall may extend from a bottom edge of the rear wall of the housing. In some implementations, the second height may be less than the first height of the rear wall, such that in a rear elevational view the central region of the rear wall may appear sunken.

In some embodiments of this aspect, a distance between a top edge of the first guide part of the front wall of the housing and a bottom edge of the front wall of the housing may be the first height of the front wall of the housing.

In some embodiments of this aspect, a distance between a top edge of the first guide part of the rear wall of the housing and a bottom edge of the rear wall of the housing may be the first height of the rear wall of the housing.

In some embodiments of this aspect, a distance between a top edge of the second guide part of the front wall of the housing and a bottom edge of the front wall of the housing may be the second height of the front wall of the housing.

In some embodiments of this aspect, a distance between a top edge of the second guide part of the rear wall of the housing and a bottom edge of the rear wall of the housing may be the second height of the rear wall of the housing.

In some embodiments of this aspect, the terminal set may be comprised of a terminal fixing seat and a terminal base to which the metal terminals are fixed. The terminal base may be comprised of at least one base-positioning space and at least one base-positioning unit. The terminal fixing seat may be comprised of at least one fixing-seat-positioning space and at least one fixing-seat-positioning unit configured such that, when the terminal base and the terminal fixing seat are fitted together, the at least one base-positioning unit may extend into the at least one fixing-seat-positioning space, and the at least one fixing-seat-positioning unit may extend into the at least one base-positioning space.

In some embodiments of this aspect, the front docking holes may be symmetrically positioned relative to the rear docking holes. For example, the rear docking holes may be symmetrically positioned relative to the front docking holes such that each front docking hole is aligned with a corresponding rear docking hole along a common line extending orthogonally through a midplane of the housing.

According to another aspect of the present invention, an electrical connector is provided that may be comprised of an insulating body and a housing. The insulating body may be comprised of an accommodating space and an island extending into the accommodating space from a bottom surface of the insulating body. The housing may be comprised of a plurality of walls defining an assembly space. The walls of the housing may be configured to surround external surfaces of the insulating body. In some implementations, the walls of the housing may be comprised of first and second walls facing first and second external surfaces of the insulating body, respectively. A portion of the first wall of the housing may be spaced apart from the first external surface of the insulating body to form a first docking slot in the assembly space. A portion of the second wall of the housing may be spaced apart from the second external surface of the insulating body to form a second docking slot in the assembly space. The first wall of the housing may be comprised of a plurality of first docking holes in communication with the first docking slot. The second wall of the housing may be comprised of a plurality of second docking holes in communication with the second docking slot.

In some embodiments of this aspect, the insulating body may be comprised of a first wall, a plurality of first protrusions extending outward from the first wall, a second wall, and a plurality of second protrusions extending outward from the second wall.

In some embodiments of this aspect, a perimeter of the first docking slot may be defined by the first wall of the insulating body, the first protrusions of the insulating body, and the first wall of the housing, and a perimeter of the second docking slot is defined by the second wall of the insulating body, the second protrusions of the insulating body, and the second wall of the housing.

In some embodiments of this aspect, the housing may be comprised of at least one first snap-fit part located on the second wall of the housing. The insulating body may be comprised of at least one third snap-fit part configured to engage with the at least one first snap-fit part of the housing when the insulating body is in a mated position with the housing.

In some embodiments of this aspect, the housing may be comprised of at least one second snap-fit part located on a third wall of the housing or on each of the third wall and a fourth wall of the housing. The insulating body may be comprised of at least one fourth snap-fit part configured to engage with the at least one second snap-fit part of the housing when the insulating body is in the mated position with the housing.

In some embodiments of this aspect, the first docking slot may have a first dimension in a lengthwise direction, the second docking slot may have a second dimension in the length wise direction, with the first dimension being different from the second dimension. In some implementations, the first dimension may be greater than the second dimension.

In some embodiments of this aspect, the first docking holes may be symmetrically positioned relative to the second docking holes.

The foregoing features may be used, separately or together in any combination, in any of the aspects and embodiments of the invention discussed herein.

BRIEF DESCRIPTION OF THE DRAWINGS

Various aspects and embodiments of the present technology disclosed herein are described below with reference to the accompanying drawings. It should be appreciated that the figures shown in the drawings are not necessarily drawn to scale. Items appearing in multiple figures may be indicated by the same reference numeral. For the purposes of clarity, not every component may be labeled in every figure.

DETAILED DESCRIPTION

Figure 1:
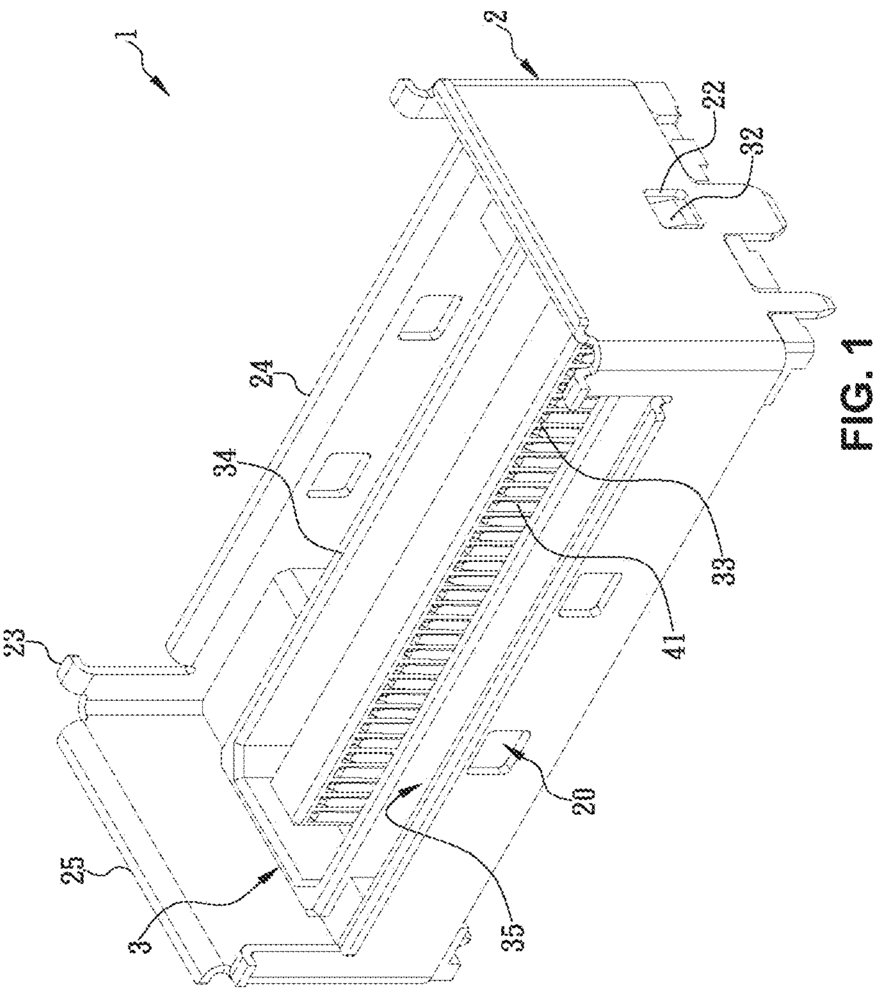
FIG. 1 shows a top rear perspective view of an electrical connector, according to some embodiments of the present invention.

The inventor has recognized and appreciated various design techniques for electrical connectors that enable an electrical connector (e.g., a receptacle connector) to connect with a mating connector (e.g., a plug connector) such that the mated pair occupies a small volume while providing reliable operation for high-integrity signal interconnects. Although the electrical connector may be relatively compact in size, proper connection of the electrical connector with the mating connector may be made easily and reliably by a user due to design features that make the electrical connector robust and user-friendly as well as compact. The robustness and ease of use of the electrical connectors according to various embodiments of the present invention may provide users with a level of assurance that routine mating operations will be unlikely to cause damage. For example, in some embodiments, features of the electrical connector may minimize or prevent misalignment and/or may enable users to easily ascertain that the electrical connector is properly aligned before a mating force is applied to seat the electrical connector and the mating connector in a mated position.

The inventor has further recognized and appreciated that compact electrical connectors may be more likely to be damaged by some forces than other forces as a result of their miniaturized size. For example, in mating a plug connector with a receptacle connector, although it may be preferred to have a force be applied in a direction parallel to an axial direction of the receptacle connector, in practice, however, a user may not pay special attention to an angle at which the plug connector is oriented with respect to the receptacle connector, or the location of the receptacle connector may be such that user may not be able to see whether the angle at which the plug connector is oriented is aligned with the axial direction of the receptacle connector. Thus, the receptacle connector may be subjected to an applied external force that is not parallel to the axial direction of the receptacle connector. Such off-axis forces can impact the receptacle connector in ways that impact the integrity of signals passing through the receptacle connector. Off-axis forces, for example, may cause the receptacle connector to tilt. In some situations, an off-axis force may be sufficient to break solder joints connecting metal terminals of the receptacle connector to a PCB. In other scenarios, an off-axis force may deform the metal terminals, shift their positions, or otherwise alter their signal paths through the receptacle connector in ways that degrade the integrity of signals passing through the receptacle connector.

Damage may also result if a user attempts to press the plug connector into the receptacle connector with the wrong orientation or with the plug connector misaligned (e.g., laterally shifted) with respect to the receptacle connector. For example, when a user attempts to insert a misaligned plug connector, the receptacle connector may be subjected to a large force, such as 55 N or more. In addition to the potential damage to the solder connections of the metal terminals, discussed above, the force may be sufficient to deform or break one or more portions of an insulating body of the receptacle connector, including a portion bounding a receiving portion in which the plug connector is to be seated when properly mated with the receptacle connector. The receptacle connector may then cease to be able to hold the plug connector snugly and reliably, thus creating the possibility of intermittent disconnection between the plug and receptacle connectors. Consequently, the receptacle connector may lose its functionality and, in turn, normal operation of an electronic device employing the receptacle connector may cease.

The above-noted risks of damage are greater for compact connectors, such as those with metal terminals spaced, center to center, at 0.6 mm or less, such as connectors with a terminal spacing of 0.5 mm or less, or 0.4 mm or less, or 0.35 mm or less.

Some aspects of the present technology described herein may reduce or eliminate the possibility of improper orientation of a plug connector during a mating operation with a receptacle connector. Some aspects may reduce or eliminate the possibility of misalignment between the plug and receptacle connectors. Some aspects may minimize or eliminate the application of damaging forces during a mating operation.

The inventor has recognized that at times an electrical connector may need to be reliably and securely connected to some mating connectors in any of two reversible orientations and at other times the electrical connector may need to be reliably and securely connected to some other mating connectors in only a single orientation. For example, the electrical connector may be connected to a first type of mating connector with a front surface of the first type of mating connector facing frontward or facing rearward, and the same electrical connector may be connected to a second type of mating connector with only a front surface of the second type of mating connector facing frontward.

Figure 5:
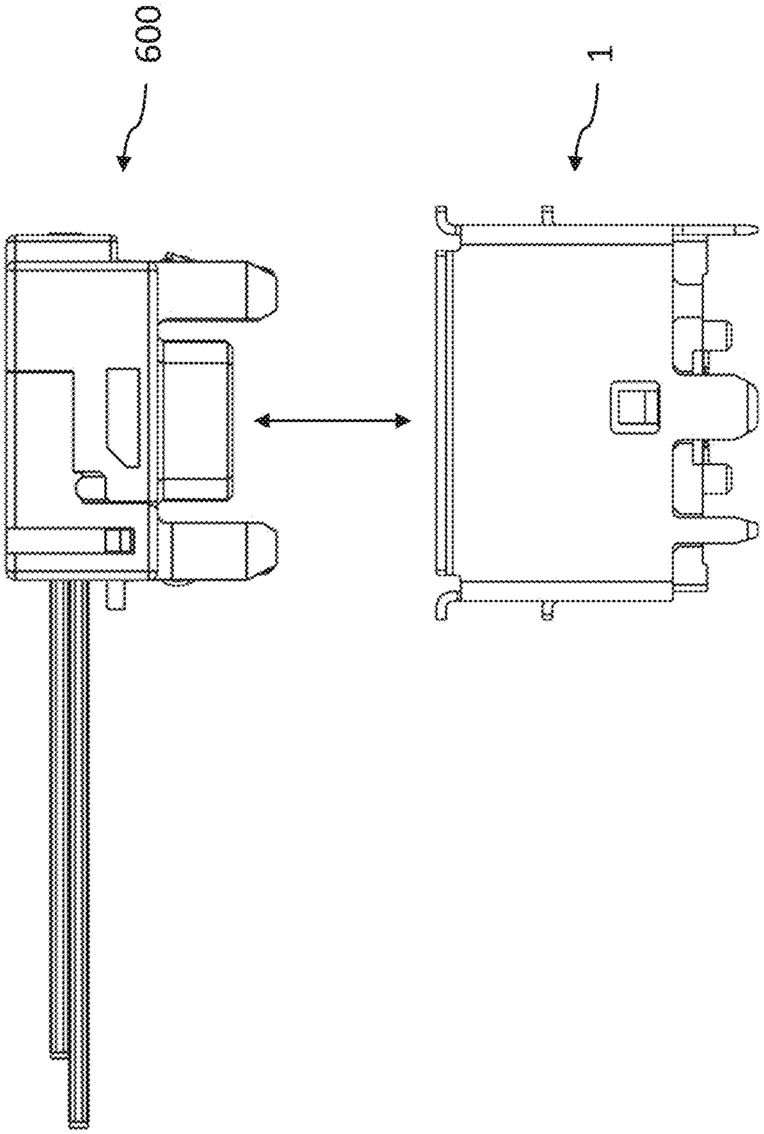
FIG. 5 shows a side elevational view of a plug connector useable with an electrical connector, according to some embodiments of the present invention, in which the plug connector is aligned for mating with the electrical connector.
Figure 6B:
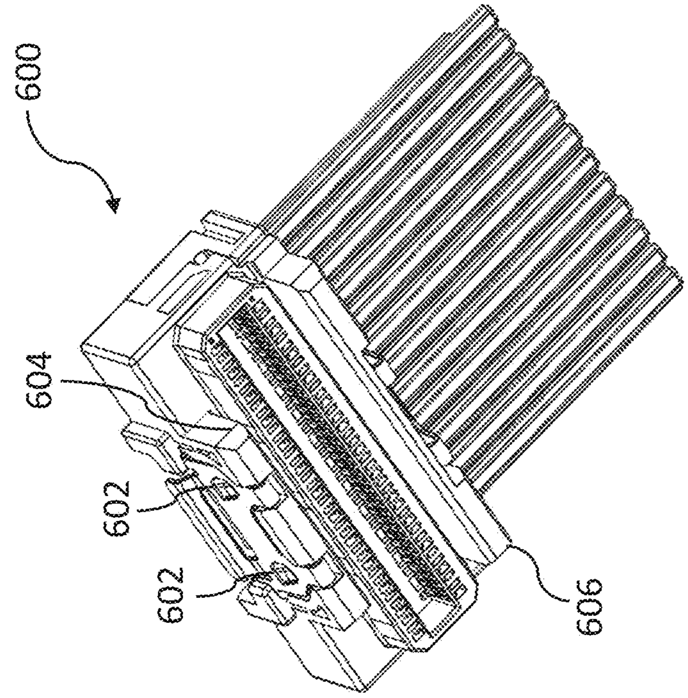
FIGS. 6A, 6B, and 6C show a bottom side perspective view, a bottom front perspective view, and a side rear perspective view, respectively, of the plug connector of FIG. 5.
Figure 6A:
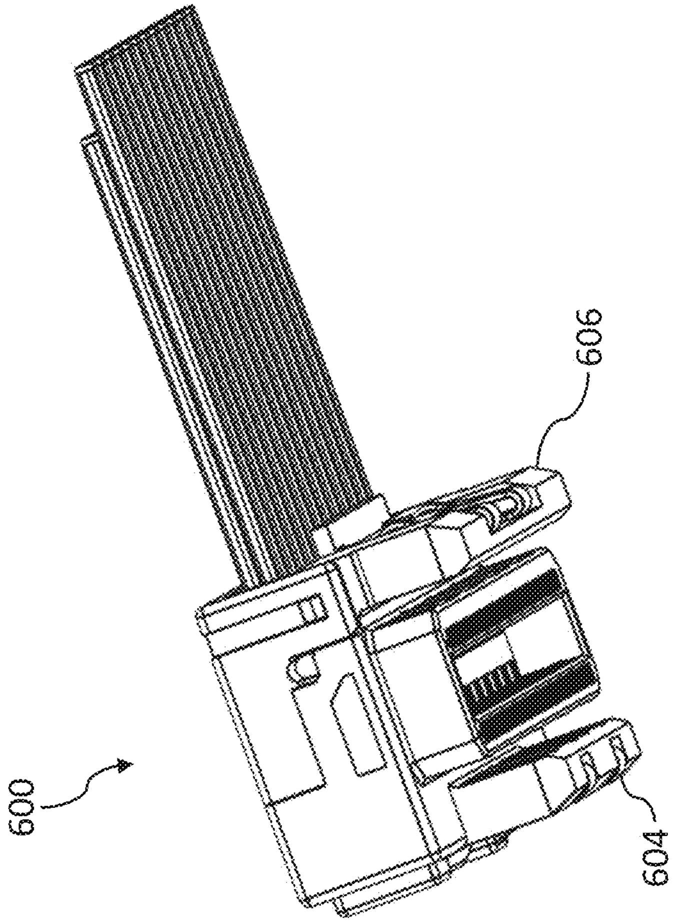
Figure 6C:
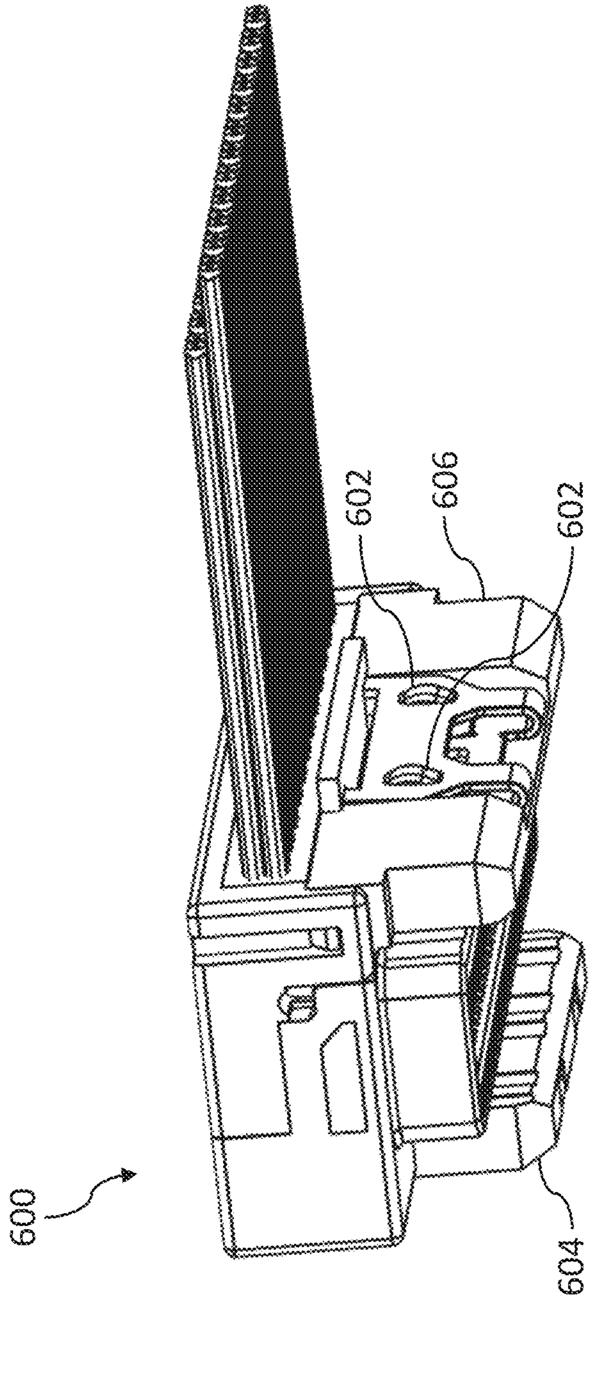

Turning now to the drawings, FIG. 1 shows a top rear perspective view of an electrical connector 1 according to some embodiments of the present invention. In some embodiments, the electrical connector 1 may be a receptacle connector configured to mate with a plug connector. For example, the electrical connector 1 may be a board connector configured to be mounted on or fixed to a printed circuit board ("PCB") and to electrically connect a plug connector to the PCB. In FIG. 1, the electrical connector 1 is a vertical-type connector configured to be mated in a vertical direction (e.g., with a mating force applied downward from above the electrical connector 1). FIG. 5 shows a side elevational view of a plug connector 600 useable with the electrical connector 1, according to some embodiments. In FIG. 5, the plug connector 600 and the electrical connector 1 are in alignment for mating, and the double-headed arrow shows a vertical direction in which these connectors may be brought towards each other to mate. FIGS. 6A, 6B, and 6C show a bottom side perspective view, a bottom front perspective view, and a side rear perspective view, respectively, of the plug connector 600.

Figure 2:
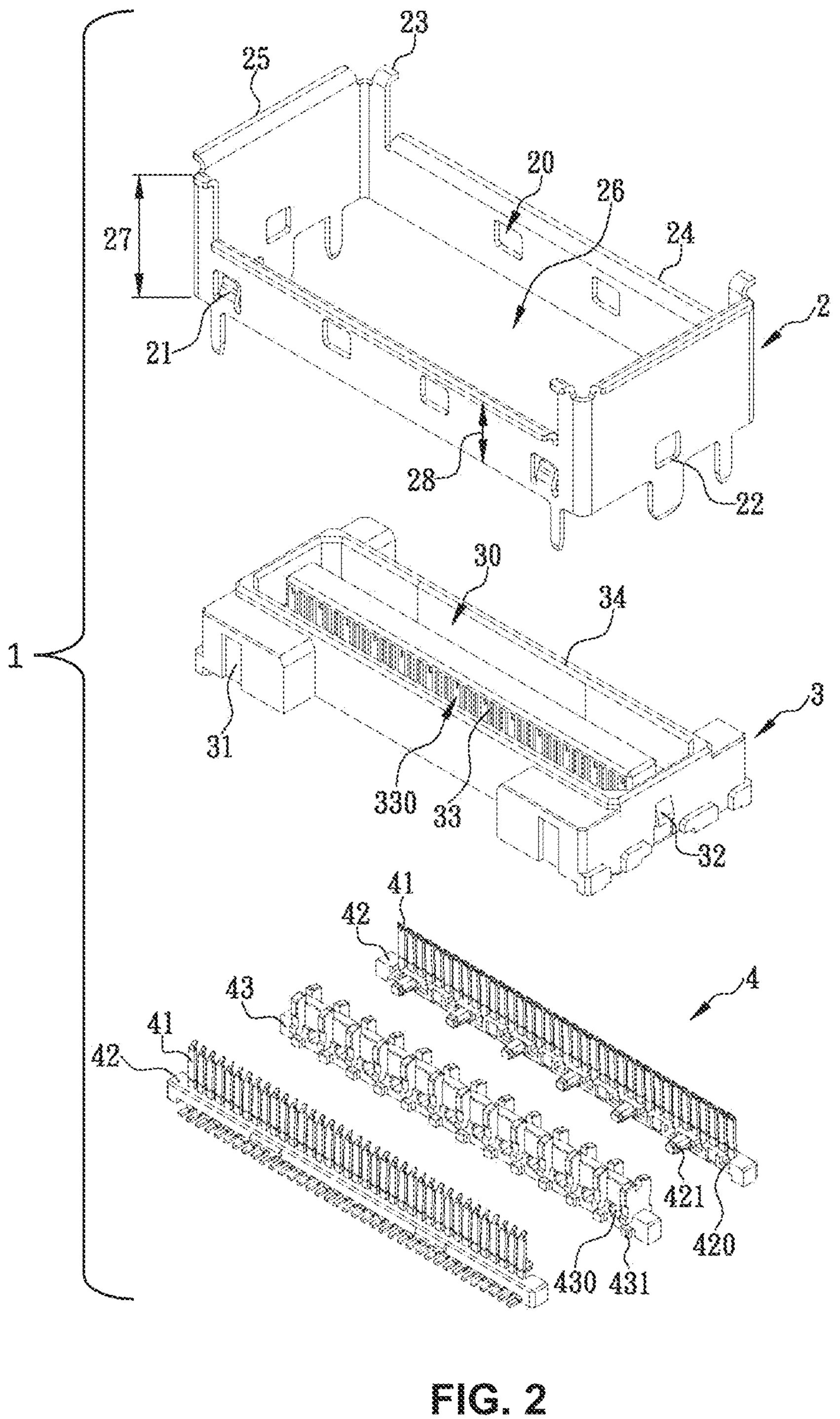
FIG. 2 shows a top front perspective view of an electrical connector in a partially disassembled state, according to some embodiments of the present invention.
Figure 3:
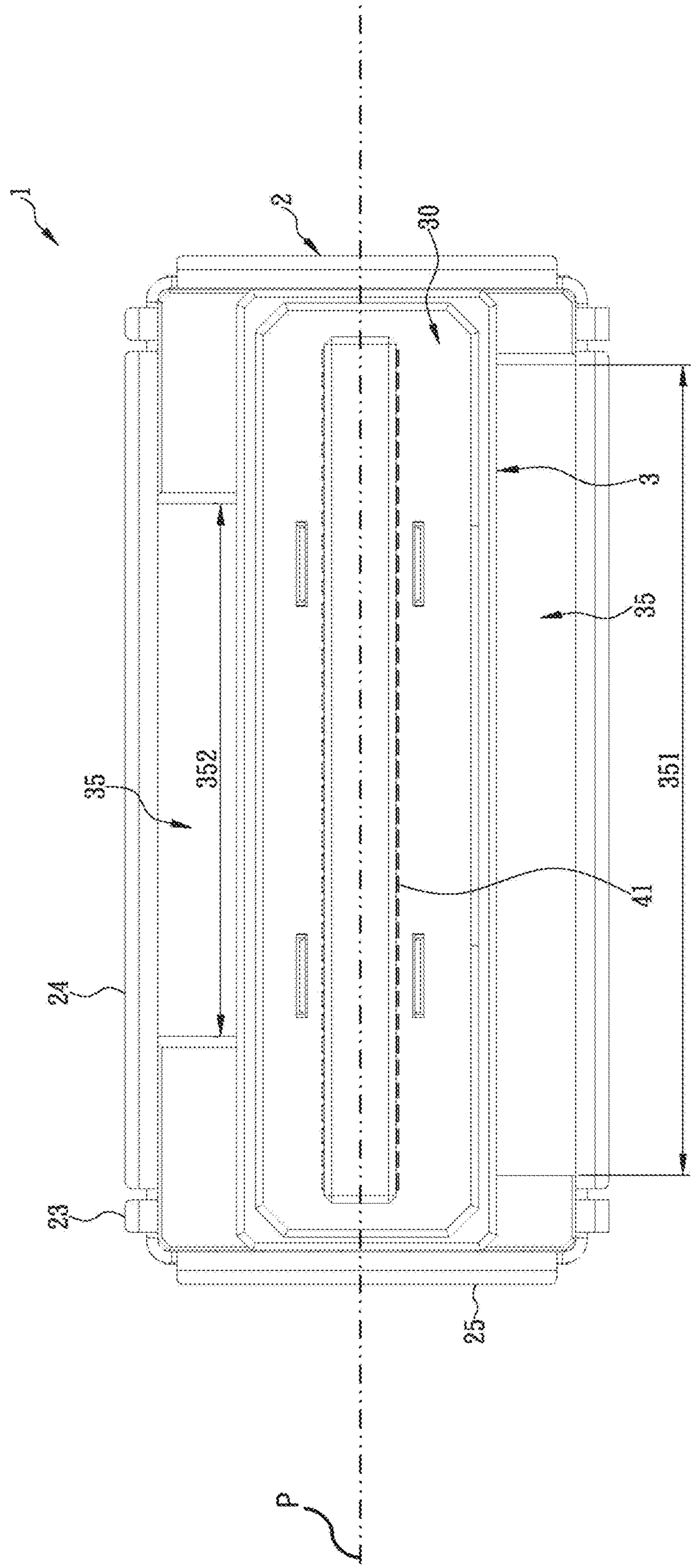
FIG. 3 shows a top plan view of an electrical connector, according to embodiments of the present invention.

FIG. 2 shows a top front perspective view of the electrical connector 1 in a partially disassembled state, according to some embodiments of the present invention. FIG. 3 shows a top plan view of the electrical connector 1 according to some embodiments of the present invention.

The electrical connector 1 may be comprised of a housing 2, an insulating body 3, and a terminal set 4. To facilitate an explanation of various elements of the electrical connector 1, bottom left areas of the housing 2, the insulating body 3, and the terminal set 4 in FIG. 2 will be described as front areas; top right areas of the housing 2, the insulating body 3, and the terminal set 4 in FIG. 2 will be described as rear areas; areas toward the left of the housing 2, the insulating body 3, and the terminal set 4 in FIG. 2 will be described as left areas; and areas toward the right of the housing 2, the insulating body 3, and the terminal set 4 in FIG. 2 will be described as right areas. As will be appreciated, these designations of "front" and "rear" and "left" and "right" are used herein to provide points of reference for the sake of clarity in the following discussions and are not intended to be absolute designations of what must be or should be the front, rear, left, and right of the electrical connector 1. Further, although the electrical connector 1 is depicted in FIGS. 1 to 5 to be a vertical-type connector (e.g., a vertical-type board connector), the scope of the present invention encompasses other embodiments in which connectors may be horizontal-type connectors, or sunken or sink-type connectors, or the like.

Referring to FIGS. 1 to 3, the housing 2 of the electrical connector 1 may be comprised of an assembly space 26 in which the insulating body 3 may be positioned. In some embodiments of the present invention, the housing 2 may be comprised of walls configured to encircle the insulating body 3.

The housing 2 may be comprised of at least one docking hole 20 located in each of a front wall and a rear wall of the housing 2, as shown in FIG. 2. In some embodiments of the present invention, the at least one docking hole 20 in the front wall of the housing 2 and the at least one docking hole 20 in the rear wall of the housing 2 may be located at symmetrical positions with respect to each other. Such symmetry may be understood with reference to FIGS. 3, 4A, and 4B.

FIG. 3 shows a midplane P of the housing 2. As will be appreciated, the midplane P is not a physical structure of the electrical connector 1 but is an imaginary plane located midway between the front and rear walls of the housing 2. In some embodiments of the present invention, the midplane P may be considered to bisect the housing 2 in a lengthwise direction. FIG. 4A shows the midplane P in a top front perspective view of the housing 2. According to some embodiments, symmetry of the docking holes 20 is such that a left docking hole 20 in the front wall of the housing 2 and a left docking hole 20 in the rear wall of the housing 2 are both centered about an imaginary line L that extends orthogonally from the midplane P, and such that a right docking hole 20 in the front wall of the housing 2 and a right docking hole 20 in the rear wall of the housing 2 are both centered about an imaginary line R that extends orthogonally from the midplane P.

According to some embodiments of the present invention, symmetry of the docking holes 20 is such that, when the housing 2 is rotated 180° about a central vertical axis C, the docking holes 20 in the front wall are rotated to the locations of the docking holes 20 in the rear wall prior to the rotation, and the docking holes 20 in the rear wall are rotated to the locations of the docking holes 20 in the front wall prior to the rotation.

Figure 4B:
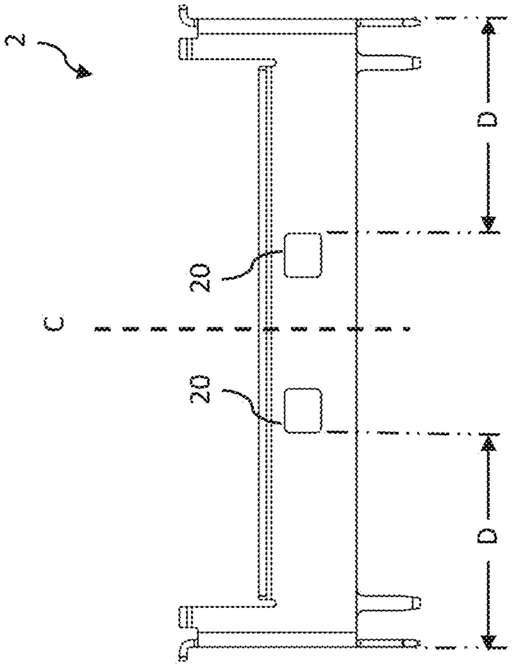
FIGS. 4A and 4B show a top front perspective view and a front elevational view, respectively, of a housing of an electrical connector, according to some embodiments of the present invention. As shown, docking holes on one side of a midplane of the housing are symmetrical with docking holes on an opposite side of the midplane.
Figure 4A:
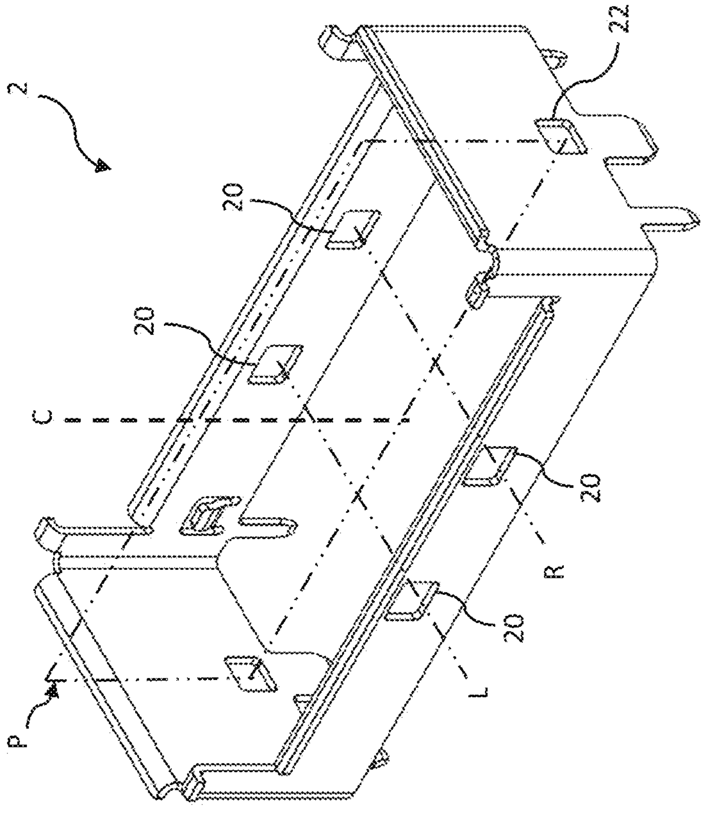

FIG. 4B shows a front elevational view of the housing 2. According to some embodiments of the present invention, symmetry of the docking holes 20 is such that a distance D extends from a left wall of the housing 2 to a closest edge of a closest docking hole 20 (i.e., the left docking hole 20 in the view of FIG. 4B), and a same distance D extends from a right wall of the housing 2 to a closest edge of a closest docking hole 20 (i.e., the right docking hole 20 in the view of FIG. 4B). Although not shown in the drawings, the distance D may describe a distance from the left wall and right walls of the housing 2 to a closest edge of a closest docking hole 20 on the rear wall of the housing 2.

Each of the docking holes 20 may be in communication with the assembly space 26. In some embodiments, the docking holes 20 may be configured to engage with protrusions on a mating connector such that, when the electrical connector 1 is in a mated position with the mating connector, the protrusions on the mating connector extend into and are lodged in the docking holes 20, such that a position of the mating connector relative to the electrical connector 1 may be set. For example, the docking holes 20 may be configured to engage with protruding bumps 602 on docking legs 604, 606 of the plug connector 600.

The housing 2 may be comprised of at least one first snap-fit part 21 provided at the front wall or at the rear wall of the housing 2. In FIG. 2, two first snap-fit parts 21 are shown on the front wall of the housing 2, although in other embodiments of the present invention there may be only one first snap-fit part 21 or more than two first snap-fit parts 21.

In some embodiments, each first snap-fit part 21 may be comprised of a plate body structure configured to engage with a corresponding snap-fit structure (e.g., a hole or a recess) of the insulating body 3. For example, the plate body structure may be a plate-like portion of the housing 2 that is bent to protrude inward to engage with the insulating body 3 when the housing 2 and the insulating body 3 are assembled together, to fix a position of the housing 2 relative to the insulating body 3. Alternatively, in some other embodiments, each first snap-fit part 21 of the housing 2 may be comprised of an opening or a recess configured to engage with a corresponding snap-fit structure (e.g., a protruding bump) of the insulating structure 3.

The housing 2 may be comprised of at least one first guide part 23 and at least one second guide part 24 provided at the front wall and/or at the rear wall of the housing 2. In some embodiments of the present invention, the first and second guide parts 23, 24 may be located at top end portions of the front wall and/or top end portions of the rear wall of the housing 2. In FIG. 2, each of the front and rear walls of the housing 2 is comprised of a pair of first guide parts 23 separated by one second guide part 24, which form the top end portions of the wall. As will be appreciated, in other embodiments there may be different numbers of the first and second guide parts 23, 24 on the front wall and/or the rear wall of the housing 2. In some embodiments, the housing 2 may be provided with the first and second guide parts 23, 24 at the front wall only or at the rear wall only.

The housing 2 may be comprised of at least one second snap-fit part 22 provided at a left wall and/or a right wall of the housing 2. In FIG. 2, each of the left and right walls of the housing 2 is provided with one second snap-fit part 22. As will be appreciated, in some embodiments of the present invention there may be a different number of the second snap-fit part 22. In some embodiments, each second snap-fit part 22 may be comprised of a plate body structure configured to engage with a corresponding snap-fit structure (e.g., a hole or a recess) of the insulating body 3. Alternatively, in some other embodiments, each second snap-fit part 22 of the housing 2 may be comprised of an opening or a recess configured to engage with a corresponding snap-fit structure (e.g., a protruding bump) of the insulating body 3. In some embodiments, each second snap-fit part 22 may be bisected by the midplane P, as shown in FIG. 4A.

The housing 2 may be comprised of at least one third guide part 25 provided at the left wall and/or the right wall of the housing 2. In some embodiments of the present invention, one or more third guide part(s) 25 may be located at a top end portion of the left wall and/or a top end portion of the right wall of the housing 2. In FIG. 2, each of the left and right walls of the housing 2 is comprised one third guide part 25 forming the top end portion of the wall. As will be appreciated, in other embodiments there may be a different number of the third guide part 25 on the left wall and/or the right wall of the housing 2.

Each of the first, second, and third guide parts 23, 24, 25 may be comprised of a top edge portion of the housing 2 that is bent or formed to curve outwards or away from the assembly space 26. Such curvature of the first, second, and third guide parts 23, 24, 25 may guide a user in a mating operation of the electrical connector 1 with a mating connector. For example, during a blind vertical mating operation, the user may be able to feel the curvature of one or more of the first, second, and third guide parts 23, 24, 25 and use the curvature to guide a downward sliding movement of the mating connector relative to the electrical connector 1 to achieve a proper engaged or mated position.

In some embodiments of the present invention, a central region of the front wall of the housing 2 may be shorter in height than left and right end regions of the front wall, such that in a front elevational view the central region may appear sunken relative to the left and right regions of the front wall. Similarly, in some embodiments, a central region of the rear wall of the housing 2 may be shorter in height than left and right ends regions of the rear wall, such that in a rear elevational view the central region may appear sunken relative to the left and right regions of the rear wall. As shown in FIG. 2, the left and right regions may have a first height 27 and the central region may have a second height 28 different from the first height 27, with each height being a vertical distance from a bottom end of the housing 2 to a top end of the housing 2 at the region of interest. More specifically, at each of the left and right regions of the front wall of the housing 2, the first height 27 may be measured as a vertical distance from a top edge of the first guide part 23 to the bottom end of the front wall of the housing 2. Similarly, at the central region of the front wall of the housing 2, the second height 28 may be measured as a vertical distance from a top edge of the second guide part 24 to the bottom end of the front wall of the housing 2. In various embodiments described above and shown in FIG. 2, the first height 27 may be greater than the second height 28 at the front wall and the rear wall of the housing 2. Alternatively, in some other embodiments, the front wall of the housing 2 and/or the rear wall of the housing 2 may have a uniform height (e.g., the first height 27 or the second height 28) without any sunken central region, or the front wall of the housing 2 and/or the rear wall of the housing 2 may have more than two different heights.

According to some embodiments of the present invention, the insulating body 3 may be configured to fit into the assembly space 26 of the housing 2, as depicted in FIGS. 1 to 3. The insulating body 3 may be comprised of a plug-in port 34 provided at a top side of the insulating body 3. The plug-in port 34 may be comprised of surfaces (e.g., walls) in communication with an accommodating space 30. In some embodiments, the plug-in port 34 and the accommodating space 30 may be configured to receive a terminal docking end of a mating connector (e.g., the plug connector 600) by a sliding movement in which a user causes the terminal docking end to slide downward into the accommodating space 30 along the surfaces of the plug-in port 34. For example, as depicted in FIG. 5, during a mating operation the mating connector (e.g., the plug connector 600) may slide downward along the surfaces of the plug-in port 34 into the accommodating space 30 of the insulating body 3 to mate with the electrical connector 1. When the terminal docking end of the mating connector is seated in a mated position in the accommodating space 30, the electrical connector 1 and the mating connector may form an electrical connection that enables transmission of signals and/or power between these connectors.

According to some embodiments of the present invention, when the insulating body 3 is fitted into the assembly space of the housing 2, portions of external or outward-facing surfaces of a front wall and a rear wall of the insulating body 3 may be spaced apart from portions of inward facing surfaces of the front wall and the rear wall of the housing 2, respectively, so as to form a docking slot 35 on front and rear sides of the electrical connector 1. The docking holes 20 in the front wall of the housing 2 may be in communication with the docking slot 35 on the front side of the electrical connector 1, and the docking holes 20 in the rear wall of the housing 2 may be in communication with the docking slot 35 on the rear side of the electrical connector 1.

According to some embodiments of the present invention, the front wall of the insulating body 3 may be comprised of a plurality of first protrusions extending outward from the front wall, and the rear wall of the insulating body 3 may be comprised of a plurality of second protrusions extending outward from the rear wall. A perimeter of the docking slot 35 on the front side of the electrical connector 1 may be defined by the front wall of the insulating body 3, the first protrusions, and the front wall of the housing 2. Similarly, a perimeter of the docking slot 35 on the rear side of the electrical connector 1 may be defined by the rear wall of the insulating body 3, the second protrusions, and the rear wall of the housing 2.

In some embodiments of the present invention, the docking slot 35 on the front side of the electrical connector 1 may have a dimension that is different from that of the docking slot 35 on the rear side of the electrical connector 1. For example, as shown in FIG. 3, the docking slot 35 on the front side may have a first dimension 351 in a lengthwise direction, and the docking slot 35 on the rear side may have a second dimension 352 greater than the first dimension 351. The first dimension 351 may be a distance separating left and right first protrusions projecting outward from the front wall of the insulating body 3, and the second dimension 352 may be a distance separating left and right second protrusions projecting outward from the rear wall of the insulating body 3. The first dimension 351 may be measured from opposing surfaces of the left and right front protrusions of the front wall of the insulating body 3, and the second dimension 352 may be measured from opposing surfaces of the left and right rear protrusions of the rear wall of the insulating body 3. Alternatively, in some embodiments, the second dimension 352 may be greater than the first dimension 351. In some other alternative embodiments, the first and second dimensions 351, 352 may be the same.

The docking slots 35 on the front and rear sides of the electrical connector 1 may be configured to receive therein docking legs of a mating connector. For example, the docking slot 35 on the front side of the electrical connector 1 may be configured to receive a front docking leg 604 of the plug connector 600, and the docking slot 35 on the rear side of the electrical connector 1 may be configured to receive a rear docking leg 606 of the plug connector 600.

When the first and second dimensions 351, 352 are different from each other, a user may use the different dimensions to determine proper front and rear orientations of a mating connector and thus avoid mating-operation mistakes, which may damage the electrical connector and/or the mating connector. For example, if the docking slot 35 on the front side of the electrical connector 1 is dimensionally smaller than the docking slot 35 on the rear side of the electrical connector 1, the user may use this difference to easily ascertain that the smaller docking leg of the mating connector should be inserted in the front docking slot 35 and the larger docking leg of the mating connector should be inserted in the rear docking slot 35. The size differences may be used advantageous to prevent errors in mating operations.

Alternatively, in some embodiments of the present invention, when the first and second dimensions 351, 352 are the same, the user may easily ascertain that there is no orientation restriction for properly connecting a mating connector to the electrical connector 1 (e.g., the mating connector may be reversible and may be properly connected in two different orientations).

In some other alternative embodiments of the present invention, when the first and second dimensions 351, 352 of the electrical connector 1 are different, but a mating connector has docking legs sized to fit in the docking slots 35 in either of two reversible orientations, the mating connector may be mated to the electrical connector 1 in either of the two orientations. As will be appreciated, in order for reversible orientations to be possible, symmetrically located protrusions on the docking legs of the mating connector are configured to align with the symmetrically located docking holes 20 on the front and rear sides of the electrical connector 1.

The insulating body 3 may be comprised of at least one third snap-fit part 31 configured to engage with the at least one first snap-fit part 21 of the housing 2. In FIG. 2, the insulating body 3 is shown to have two third snap-fit parts 31, one on each of the first protrusions extending from the front wall of the insulating body 3. In some embodiments of the present invention, the number of third snap-fit parts 31 may be different from what is shown in FIG. 2. Further, although not specifically shown in FIGS. 1 to 3, the insulating body 3 may be comprised of at least one third snap-fit part 31 provided on the rear wall (e.g., on the second protrusions extending from the rear wall of the insulating body 3), according to some embodiments. In some embodiments, each third snap-fit part 31 may have a slot structure or may be a recess configured to receive and engage with a protrusion forming a corresponding first snap-fit part 21 of the housing 2. As described above, each first snap-fit part 21 of the housing 2 may be comprised of a plate body structure configured to engage with the slot structure or the recess forming a corresponding third snap-fit part 31. In some alternative embodiments, each third snap-fit part 31 of the insulating body 3 may be comprised of plate body structure configured to engage with a slot structure or a recess forming a corresponding first snap-fit part 21 of the housing 2. Corresponding first and third snap-fit parts 21, 31 may work together to fix a position of the insulating body 3 in the assembly space 26 of the housing 2.

According to some embodiments of the present invention, the insulating body 3 may be comprised of at least one fourth snap-fit part 32 provided on a left wall and a right wall of the insulating body 3, as shown in FIGS. 1 and 2. Each fourth snap-fit part 32 may be configured to engage with a corresponding second snap-fit part 22 of the housing 2. In some embodiments, the fourth snap-fit part 32 may be a protruding structure that extends outward to engage with a hole or a recess forming a corresponding second snap-fit part 22. In some alternative embodiments, each fourth snap-fit part 32 may be comprised of a hole or a recess configured to engage with a protruding structure forming a corresponding second snap-fit part 22. Corresponding second and fourth snap-fit parts 22, 32 may work together to fix a position of the insulating body 3 in the assembly space 26 of the housing 2.

As shown in FIGS. 1 and 2, a terminal holding part 33 may be disposed in the accommodating space 30 of the insulating body 3, in some embodiments of the present invention. For example, the terminal holding part 33 may be an island that protrudes into the accommodating space from a base of the insulating body 3. The terminal holding part 33 may be comprised of at least one terminal holding space 330 configured to receive the terminal set 4 therein. As will be appreciated, the insulating body 3 may have a form other than what is shown in FIGS. 1 to 3. For example, in some embodiments, the insulating body 3 may be comprised of multiple plug-in ports 34 and multiple accommodating spaces 30.

The terminal set 4 may be comprised of a plurality of metal terminals 41, as shown in FIG. 2. Each of the metal terminals 41 may be used to transmit electrical power or signals, or may be used as a ground connection, as discussed below. According to some embodiments of the present invention, in an assembled state the terminal set 4 may be disposed in the terminal holding space 330 of the insulating body 3 such that top portions of the metal terminals 41 may be exposed to the accommodating space 30 through openings in the terminal holding part 33. Such exposure may enable each of the metal terminals 41 to make electrical contact with corresponding terminals of a mating connector (e.g., the plug connector 600). In some embodiments, the terminal set 4 may be positioned in the terminal holding space 330 by extending into the insulating body 3 from a bottom end of the terminal holding part 33. Bottom portions of the metal terminals 41 may be configured to be electrically connected to a circuit board (e.g., a PCB) such that each metal terminal may provide an electrical connection between the circuit board and a corresponding metal terminal of a mating connector to which the electrical connector 1 is mated. For example, one or more of the metal terminals 41 may be a signal terminal that transmits electrical signals to or from the circuit board, one or more of the metal terminals 41 may be a power terminal that transmits power to or from the circuit board, and one or more of the metal terminals 41 may be a ground terminal configured to be grounded via a ground line of the circuit board. In some alternative embodiments, the electrical connector 1 may be structured to be a wired connector that, instead of being configured to be mounted to a circuit board, may be configured to be connected to one or more wired transmission lines. For example, one or more transmission lines may be electrically connected to the bottom portions of one or more of the metal terminals 41.

In some embodiments of the present invention, the terminal set 4 may be provided with a terminal fixing seat 43 and at least one terminal base 42. In some embodiments, such as shown in FIG. 2, the terminal set 4 may be comprised of two terminal bases 42 configured to sandwich the terminal fixing seat 43. Each terminal base 42 may be provided with at least one base-positioning space 420 and at least one base-positioning unit 421. The terminal fixing seat 43 may be provided with at least one fixing-seat-positioning space 430 and at least one fixing-seat-positioning unit 431. In some embodiments, each base-positioning unit 421 of each terminal base 42 may be configured to extend into a corresponding fixing-seat-positioning space 430 of the terminal fixing seat 43, and each fixing-seat-positioning unit 431 of the terminal fixing seat 43 may be configured to extend into a corresponding base-positioning space 420 of the terminal bases 42. With such an arrangement, each terminal base 42 and the terminal fixing seat 43 may be snap-fitted together to form the terminal set 4. As shown in FIGS. 2 and 3, the terminal set 4 may be comprised of multiple rows of the metal terminals 41.

According to some embodiments of the present invention, respective groups of the metal terminals 41 may be fixed in corresponding terminal bases 42 such that the top portions of the metal terminals 41 of a group may extend from one surface of the corresponding terminal base 42 and bottom portions of the metal terminals 41 of the group may extend from another surface of the corresponding terminal base 42, as shown in FIG. 2. In other embodiments, the metal terminals 41 may be directly snap-fitted into place in the terminal holding space 330.

In some alternative embodiments of the present invention, the electrical connector may be comprised of two terminal sets 4 disposed in the accommodating space 30 of the insulating body 3. For example, one terminal set 4 may be arranged closer to the front side of the insulating body 3, and the other terminal set 4 may be arranged closer to the rear side of the insulating body 3. In other alternative embodiments, the insulating body may be comprised of multiple accommodating spaces 30 each configured to hold a terminal set 4 therein. Thus, it should be understood that the electrical connector 1 is not limited to the embodiments shown in the drawings but may be comprised of multiple terminal sets 4 arranged in multiple accommodating spaces 30.

In summary, it should be understood from the foregoing descriptions and the accompanying drawings that an electrical connector according to various embodiments of the present invention (e.g., the electrical connector 1) may be connected with a mating connector (e.g., the plug connector 600) by aligning the electrical connector's docking holes (e.g., the docking holes 20) with protrusions (e.g., the bumps 602) or other types of structures projecting from docking legs (e.g., the docking legs 604, 606) of the mating connector. According to some embodiments of the present technology, when the docking holes are symmetrically situated on opposite sides of the electrical connector, the mating connector may be snap-fit mated with the electrical connector in two different orientations (e.g., a normal orientation and a reversed orientation that is a 180° rotation from the normal orientation), provided that the mating connector has docking legs that are sized to fit in the docking slots 35 in both orientations. Thus, electrical connectors according to various embodiments of the present invention may be useable with various different mating connectors, some of which may be reversibly mated (e.g., by having docking legs 604, 606 that are dimensioned to fit in the docking slots 35 in two different orientations) and some of which may be mated in only a single orientation (e.g., by having docking legs 604, 606 that are differently dimensioned to fit the different dimensions 351, 352 of the docking slots 35 in one orientation).

It is to be understood that the foregoing features may be used, separately or together in any combination, in any of the embodiments discussed herein.

Further, although advantages of the present technology may be indicated, it should be appreciated that not every embodiment of the present technology may include every described advantage. Some embodiments may not implement any feature described herein as advantageous. Accordingly, the foregoing description and attached drawings are by way of example only.

Variations of the disclosed embodiments are possible. For example, various aspects of the present technology may be used alone, in combination, or in a variety of arrangements not specifically discussed in the embodiments described in the foregoing, and therefore they are not limited in application to the details and arrangements of components set forth in the foregoing description or illustrated in the drawings. Aspects described in one embodiment may be combined in any manner with aspects described in other embodiments.

Use of ordinal terms such as "first," "second," "third," etc., in the description and the claims to modify an element does not by itself connote any priority, precedence, or order of one element over another, or the temporal order in which acts of a method are performed, but are used merely as labels to distinguish one element or act having a certain name from another element or act having a same name (but for use of the ordinal term) to distinguish the elements or acts.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

As used herein in the specification and in the claims, the term "equal" or "the same" in reference to two values (e.g., distances, widths, etc.) means that two values are the same within manufacturing tolerances. Thus, two values being equal, or the same, may mean that the two values are different from one another by ±5%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Finally, it is to be understood that the scope of the present invention is not limited to claims recited below or the embodiments described herein and shown in the drawings. It is to be understood that the scope of the invention and the claims includes equivalent modifications and variations that can be conceived by one of ordinary skill in the art based on the disclosure of the present technology.

For convenience, the following is a key to reference characters used herein and in the drawings for the electrical connector 1:

2: housing
20: docking hole
21: first snap-fit part
22: second snap-fit part
23: first guide part
24: second guide part
25: third guide part
26: assembly space
27: first height
28: second height
3: insulating body
30: accommodating space
31: third snap-fit part
32: fourth snap-fit part
33: terminal holding part
330: terminal holding space
34: plug-in port
35: docking slot
351: first distance
352: second distance
4: terminal set
41: metal terminal
42: terminal base
420: base-positioning space
421: base-positioning unit
43: terminal fixing seat
430: fixing-seat-positioning space
431: fixing-seat-positioning unit

What is claimed is:

1. An electrical connector, comprising:
an insulating body comprising a mating port;
a plurality of metal terminals exposed in the mating port of the insulating body; and
a metal housing comprising a plurality of walls configured to encircle the insulating body such that:
a first space is located between a first side of the insulating body and a first wall of the metal housing, and
a second space is located between a second side of the insulating body and a second wall of the metal housing,
wherein the second side of the insulating body is opposite the first side of the insulating body.

2. The electrical connector of claim 1, wherein:
the first and second walls of the metal housing face in opposite directions, and
a length of the first space is different from a length of the second space.

3. The electrical connector of claim 1, wherein the mating port is configured to receive therein a portion of a mating connector.

4. The electrical connector of claim 1, wherein:
the first wall of the metal housing comprises a plurality of first docking portions in communication with the first space, and
the second wall of the metal housing comprises a plurality of second docking portions in communication with the second space.

5. The electrical connector of claim 4, wherein the first docking portions of the metal housing are docking holes configured to receive first snap-fit protrusions of a mating connector.

6. The electrical connector of claim 5, wherein the second docking portions of the metal housing are docking holes configured to receive second snap-fit protrusions of the mating connector.

7. The electrical connector of claim 4, wherein the first docking portions of the metal housing are symmetrically positioned relative to the second holes docking portions of the metal housing.

8. The electrical connector of claim 1, wherein the insulating body comprises a protrusion configured to abut the metal housing and to bound a portion of one of the first and second spaces.

9. The electrical connector of claim 1, wherein the first space is a first docking slot configured to receive a first leg extending from a mating connector.

10. The electrical connector of claim 9, wherein the second space is a second docking slot configured to receive a second leg extending from the mating connector.

11. The electrical connector of claim 1, wherein a height of at least one of the walls of the metal housing is greater than a maximum height of the insulating body.

12. The electrical connector of claim 1, wherein a height of the first wall of the metal housing is different from a height of the second wall of the metal housing.

13. The electrical connector of claim 1, wherein the connector is a vertical-type connector.

14. The electrical connector of claim 1, wherein the metal housing comprises a plurality of inclined guide parts configured to guide a mating connector into the mating port of the insulating body.

15. The electrical connector of claim 14, wherein each of the guide parts comprises a curved surface.

16. An electrical connector, comprising:

an insulating body comprising:

a mating port that is elongated in a first direction, and a first side and a second side extending in the first direction on opposite sides of the mating port;

a plurality of metal terminals exposed in the mating port of the insulating body; and a metal housing comprising a first wall and a second wall extending in the first direction such that:

a first space elongated in the first direction is located between the first side of the insulating body and the first wall of the metal housing, and a second space elongated in the first direction is located between the second side of the insulating body and the second wall of the metal housing.

17. The electrical connector of claim 16, wherein:

each of the first wall and the second wall comprises a hole, and the hole of the first wall and the hole of the second wall are symmetrically disposed about a center line of the insulating body extending in the first direction.

18. The electrical connector of claim 17, wherein the hole of the first wall and the hole of the second wall are each configured to receive a snap-fit protrusion of a mating connector.

19. The electrical connector of claim 16, in combination with a mating connector, wherein:

the mating port is a first mating port, the mating connector comprises a second mating port configured to mate with the first mating port, and the mating connector comprises a first leg and a second leg configured to fit within the first space and the second space, respectively, when the second mating port is mated with the first mating port.

20. The electrical connector of claim 19, wherein:

each of the first wall and the second wall comprises a hole, and the mating connector comprises protrusions extending from the first leg and the second leg and configured to extend into the hole of the first wall and the second wall, respectively.

* * * * *